United States Patent
Suzuki et al.

(10) Patent No.: US 7,620,285 B2
(45) Date of Patent: Nov. 17, 2009

(54) OPTICAL WAVEGUIDE WITH A COLORED LAYER AND METHOD FOR MANUFACTURING THE SAME

(75) Inventors: Toshihiko Suzuki, Kanagawa (JP); Shigemi Ohtsu, Kanagawa (JP); Keishi Shimizu, Kanagawa (JP); Kazutoshi Yatsuda, Kanagawa (JP); Akira Fujii, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/057,006

(22) Filed: Mar. 27, 2008

(65) Prior Publication Data
US 2009/0080848 A1    Mar. 26, 2009

(30) Foreign Application Priority Data
Sep. 20, 2007    (JP) .............................. 2007-244209

(51) Int. Cl.
*G02B 6/10* (2006.01)

(52) U.S. Cl. ....................................... 385/132; 385/129
(58) Field of Classification Search .......... 385/129–132
See application file for complete search history.

(56) References Cited

U.S. PATENT DOCUMENTS

| 5,082,347 | A | * | 1/1992 | Akasaka et al. .............. 385/114 |
| 6,549,685 | B2 | * | 4/2003 | Marks et al. .................... 385/2 |
| 7,373,066 | B2 | * | 5/2008 | Ishikawa et al. ............ 385/131 |
| 2004/0218851 | A1 | * | 11/2004 | Izumitani et al. .............. 385/15 |

FOREIGN PATENT DOCUMENTS

JP    08-286064 A    11/1996

\* cited by examiner

*Primary Examiner*—Charlie Peng
(74) *Attorney, Agent, or Firm*—Sughrue Mion, PLLC

(57) ABSTRACT

The present invention provides an optical waveguide including: a cladding; at least one core embedded in the cladding; and a colored layer that is provided at a portion substantially overlapping with the core when viewed from a direction substantially perpendicular to the principal surfaces of the optical waveguide, and that is not in contact with the core.

12 Claims, 6 Drawing Sheets

US 7,620,285 B2

OPTICAL WAVEGUIDE WITH A COLORED LAYER AND METHOD FOR MANUFACTURING THE SAME

CROSS-REFERENCE TO RELATED APPLICATION

This application is based on and claims priority under 35 USC 119 from Japanese Patent Application No. 2007-244209 filed on Sep. 20, 2007.

BACKGROUND

1. Technical Field

The present invention relates to an optical waveguide that is used in an optical interconnection in which signal transmission is performed with light within an information device, and between information devices, and a method for producing the optical waveguide. More specifically, the invention relates to an optical waveguide that is produced by forming an optical waveguide core using a dicing saw.

2. Related Art

One example of an embodiment in which a polymer waveguide is applied to an optical wiring within a device, and between devices, is a multimode optical waveguide having a simple configuration in which linear cores are aligned at a desired pitch in a cladding.

When an optical waveguide is manufactured by the above method, the refractive indices of a core portion and a cladding portion are different from each other, but the core portion and the cladding portion are transparent to visible light, so that it is extremely difficult to determine the position of the core by means of image recognition by capturing an image with an image pickup device. For this reason, there are problems in that after the waveguide configuration has been formed, an automatic machine which relies on position recognition marks cannot be applied to a process such as shaping of the external shape of the waveguide into a part to be mounted, or mounting of optical components by passive alignment in which the positions of the optical components are adjusted by using a high precision multi-axis stage.

SUMMARY

According to an aspect of the invention, there is provided an optical waveguide comprising:
a cladding;
at least one core embedded in the cladding; and
a colored layer that is provided at a portion substantially overlapping with the core when viewed from a direction perpendicular to the principal surfaces of the optical waveguide, and that is not in contact with the core.

BRIEF DESCRIPTION OF THE DRAWINGS

Exemplary embodiments of the present invention will be described in detail based on the following drawings, wherein.

DETAILED DESCRIPTION

Hereinafter, the exemplary embodiments of the invention will be described with reference to the drawings attached hereto. The same notations are applied to members having substantially the same functions or operations, and duplicate explanations omitted as appropriate.

FIRST EXEMPLARY EMBODIMENT

Figure 1A:
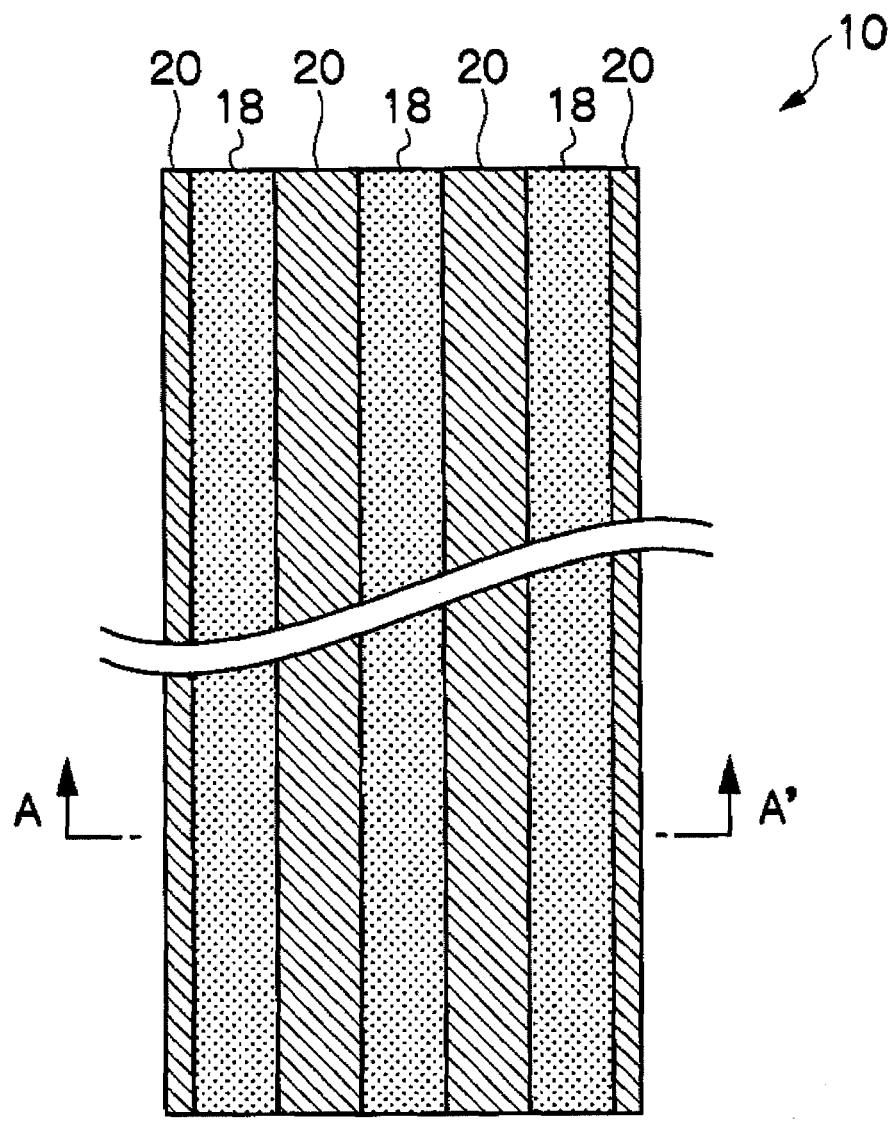
FIG. 1A is a plan view of an optical waveguide according to a first exemplary embodiment of the invention.
Figure 1B:
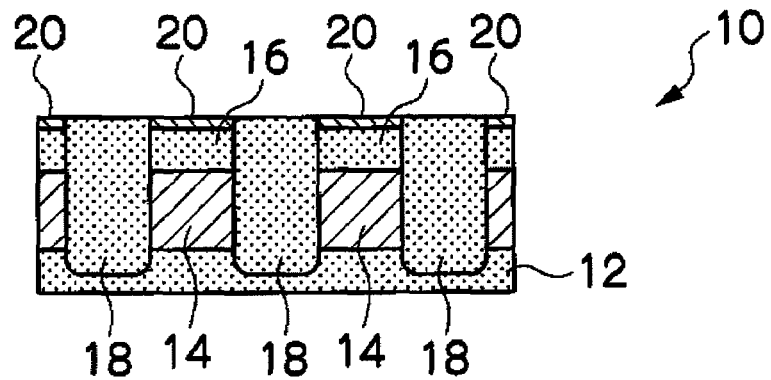
FIG. 1B is a cross-sectional view along the line A-A' in FIG. 1A.

FIGS. 1A and 1B schematically show the configuration of the optical waveguide according to the first exemplary embodiment of the invention. The optical waveguide 10 is a planar optical waveguide. A plurality of cores 14 are embedded in a cladding (lower cladding portion 12, upper cladding portions 16 and embedded cladding portions 18) in parallel to each other on a plane parallel to the principal surfaces of the optical waveguide 10. Colored layers 20 are provided on the portions that substantially overlap the respective cores 14 when viewed from a direction substantially perpendicular to the principal surfaces of the optical waveguide 10. Here, among the surfaces of the optical waveguide 10, the principal surface refers to a surface substantially perpendicular to the direction of lamination (the thickness direction of the optical waveguide 10) of the core 14 and cladding portions (lower cladding portion 12 and upper cladding portion 16) that are laminated so as to sandwich the core 14. More specifically, a surface at which the embedded cladding portions 18 and colored layers 20 appear alternately, and a surface that is opposite to the surface at which the embedded cladding portions 18 and the colored layers 20 appear alternately, and at which only the lower cladding portion 12 appears, are the principal surfaces, respectively.

Materials for the core 14, and cladding portions 12, 16 and 18 of the optical waveguide 10 according to the present exemplary embodiment are not particularly limited, as long as the materials are transparent at a wavelength of light used in the optical waveguide 10, and may be set with desired differences in the refractive index between the core 14 and cladding portions 12, 16 and 18. For example, alicyclic olefin resins, acrylic resins, epoxy resins, polyimide resins and the like may be used.

However, in order to exhibit the optical effects of the optical waveguide, the cladding portions 12, 16 and 18 may be made of materials having a lower refractive index than that of the core 14. In particular, in order to ensure the difference in refractive index between the cladding portions 12, 16 and 18 and the core 14, the relative refractive index difference between the materials of the cladding portions 12, 16 and 18, and the material of the core 14 is preferably 0.5% or more, and more preferably 1% or more. Further, the difference in refractive index among the materials of the cladding portions 12, 16 and 18 is preferably smaller, and the difference is preferably within the range of 0.05, more preferably within the range of 0.001, and yet more preferably there is no difference in view of optical confinement.

Figure 2A:
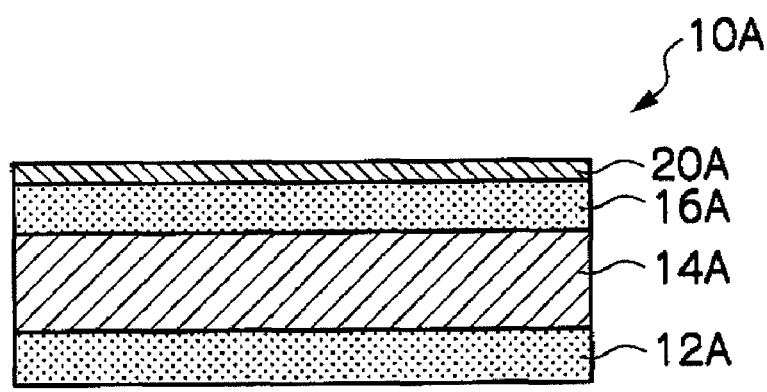
FIG. 2A to FIG. 2C show manufacturing processes of the optical waveguide according to the first exemplary embodiment of the invention.
Figure 2B:
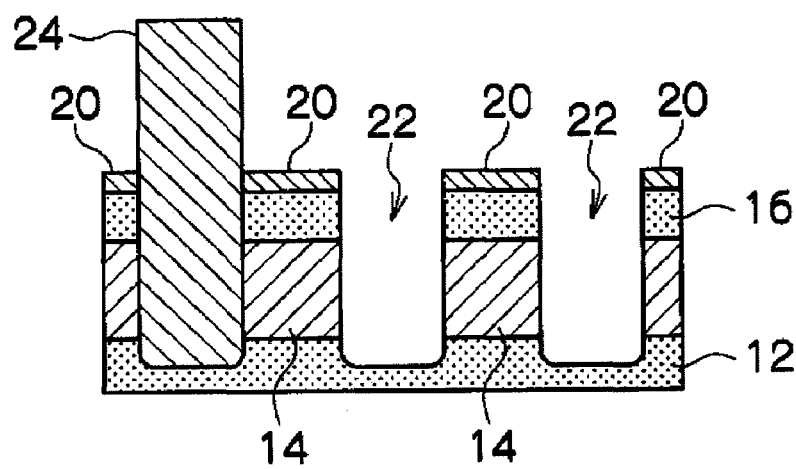
Figure 2C:
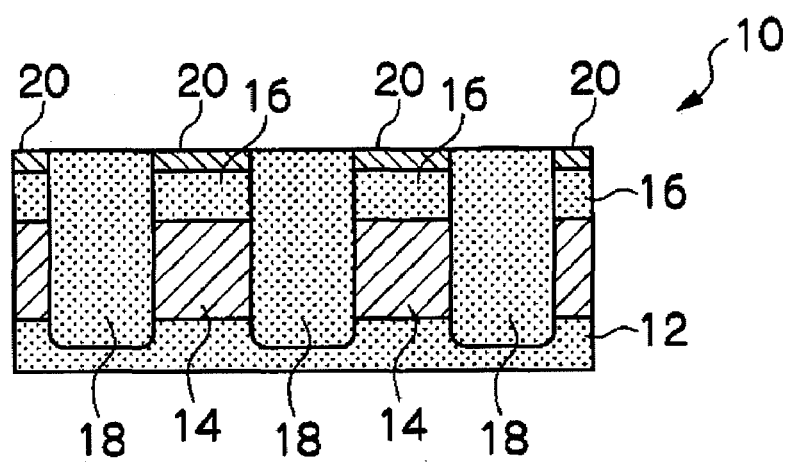

The manufacturing method of the optical waveguide 10 according to the present exemplary embodiment is not particularly limited but, for example, the optical waveguide 10 can be easily and precisely manufactured by the manufacturing method as shown in FIGS. 2A to 2C.

First, as shown in FIG. 2A, a laminated body (a polymer laminate film) 10A is prepared, including a core layer 14A, a lower cladding layer (a first cladding layer) 12A and an upper cladding layer (a second cladding layer) 16A between which the core layer 14A is sandwiched, and a colored layer 20A that is laminated on the upper cladding layer 16A without being in contact with the core layer 14A. For example, on a planar substrate (not shown) such as glass or silicon, the lower cladding layer (a lower cladding polymer layer) 12A, the core polymer layer 14A and the upper cladding polymer layer 16A are sequentially laminated, and further, the colored layer 20A is laminated on the upper cladding polymer layer 16A. Methods for laminating these layers are not particularly limited as long as these layers are integrally laminated without peeling between the layers. For example, known methods such as a lamination method, spin coat method or the like may be used.

Lower Cladding Layer

Materials for forming the lower cladding layer 12A (lower cladding portion 12) are not particularly limited as long as a predetermined difference in refractive index between the lower cladding layer 12A and the core 14 of the optical waveguide may be set, and the materials are selected in consideration of optical characteristics such as the refractive index and light transmittance, and mechanical strength, heat resistance, flexibility and the like of the materials. For example, a radiation curable resin, electron beam curable resin, thermosetting resin or the like, or preferably an ultraviolet ray curable resin or a thermosetting resin is selected. An ultraviolet ray curable or thermosetting monomer, or an ultraviolet ray curable or thermosetting oligomer, or a mixture of the monomer and the oligomer is preferably used. An ultraviolet ray curable resin is more preferably used.

Examples of specific materials for forming the lower cladding layer 12A include, for example, an epoxy resin, an acrylic resin (such as polymethyl methacrylate), an alicyclic acrylic resin, styrene resin (such as polystyrene, acrylonitrile-styrene copolymer), an olefin resin (such as polyethylene, polypropylene or ethylene-propylene copolymer), an alicyclic olefin resin, a vinyl chloride resin, a vinylidene chloride resin, a vinyl alcohol resin, a vinyl butyral resin, an allylate resin, a fluorine-containing resin, a polyester resin (such as polyethylene terephthalate or polyethylene naphthalate), a polycarbonate resin, a cellulose diacetate or cellulose triacetate resin, an amide resin (such as an aliphatic amide resin or an aromatic polyamide resin), an imide resin, a sulfone resin, a polyether sulfone resin, a polyether ether ketone resin, polyphenylene sulfide resin, a polyoxymethylene resin, and a mixture of two or more of these resins.

For example, the lower cladding layer 12A may be formed in such a manner that a liquid-state resin selected from these materials is dropped onto a substrate such as a glass plate, and is formed in a layer having a uniform thickness by means of a spin coat method, and is cured thereafter. Alternatively, a resin film that has been formed in advance may be used.

The thickness of the lower cladding layer 12A is not particularly limited, but is preferably in the range of from about 20 µm to about 200 µm, and more preferably about 30 µm to about 150 µm, in view of the optical performance, flexibility, cutting workability, which will be described later, and layer strength.

Core Layer

As materials for forming the core layer 14A (or core 14), for example, an ultraviolet ray curable resin is used, and an ultraviolet ray curable monomer, an ultraviolet ray curable oligomer, or a mixture of the monomer and the oligomer is preferably used. As specific materials for the core, an epoxy ultraviolet ray curable resin or an acrylic ultraviolet ray curable resin may be used.

For example, after a liquid-state resin of a curable resin for a core (ultraviolet ray curable resin) has been applied on the lower cladding layer 12A at a uniform layer thickness, the resultant layer may be irradiated with an ultraviolet ray by means of an ultraviolet lamp, an ultraviolet LED, an UV irradiation device or the like to cure and form a core layer 14A.

The thickness of the core layer 14A is not particularly limited, and is appropriately determined in view of the use application. The thickness is preferably in the range of from about 20 µm to about 120 µm, and more preferably about 30 µm to about 90 µm, in view of the optical performance, flexibility, cutting workability, which will be described later, and layer strength.

Upper Cladding Layer

Materials for the upper cladding layer 16A (upper cladding portion 16) are not particularly limited as long as a predetermined difference in the refractive index between the upper cladding layer 16A and the core 14 of the optical waveguide may be set, but the material for the upper cladding layer 16A may be the same as that of the lower cladding layer 12A. For example, after the same liquid-state resin as that of the lower cladding layer 12A has been applied on the core layer 14A in a uniform thickness, the coated layer is cured to form the upper cladding layer 16A.

The thickness of the upper cladding layer 16A is preferably in a range of from about 5 µm to about 200 µm, and more preferably about 10 µm to about 50 µm, in view of the optical performance, flexibility, cutting workability, which will be described below, and layer strength.

The thickness of the lower cladding layer 12A is not necessarily the same as the thickness of the upper cladding layer 16A. For example, in view of a residual thickness of the lower cladding layer 12A after cutting, which will be described later, the thickness of the upper cladding layer 16A is made thinner than that of the lower cladding layer 12A, so that the overall thickness of the laminated body 10A is reduced.

The overall thickness or the size of the laminated body 10A is not particularly limited, and may be appropriately determined in accordance with the materials and usage thereof For example, for forming a flexible optical waveguide 10, the thickness of the laminated body 10A is preferably in a range of from about 50 µm to about 500 µm, and more preferably from about 70 µm to about 300 µm. Further, the width of the laminated body 10A is preferably in a range of from about 0.5 mm to about 10 mm, and more preferably from about 1 mm to about 5 mm. When the thickness and width of the optical waveguide (laminated film) 10 are set in this range, the flexibility and strength of the optical waveguide may be secured with ease.

Colored Layer

Since the colored layer 20A is separated from the core portion 14, the optical properties of the optical waveguide 10 are not influenced by the type and characteristic of the colored layer 20A. Accordingly, as the material for forming the colored layer 20A, a material that has sufficient adhesive strength with respect to the resin constituting the upper cladding layer 16A, with which the colored layer 20A comes into contact, is used. For example, an acrylic paint or an epoxy paint may be used, without limitation on materials and coloration methods. For example, a colored layer having sufficient adhesive strength may be formed by the use of a material in which a dye or pigment exhibiting a desired color is added to a resin used for forming the upper cladding layer.

While the colored layer 20A needs to be sufficiently thick to ensure the visibility thereof, the overall thickness of the laminated body (laminated film) 10A including the colored layer 20A is preferably about 0.6 mm or less in view of machining the laminated body with a dicing saw, which will be described below.

The colored layer 20A is formed by known methods such as spin coating, spray coating, screen printing and inkjet printing without particular limitation. When the colored layer 20A is formed by means of printing technologies, printing of indexes for lot control or formation of position recognition marks as machining references for forming cores may be performed.

Next, the laminated body 10A is cut from the principal surface side at which the colored layer 20A is provided with respect to the core layer 14A, and at least the colored layer 20A, the cladding layer (upper cladding layer) 16A at the principal surface side and a part of the core layer 14A are removed to form a core portion 14. For example, as shown in FIG. 2B, a part of the laminated body is cut to a predetermined depth with a dicing saw 24 from the principal surface side at which the colored layer 20A is provided, along the longitudinal direction of the laminated body 10A, so that the colored layer 20A, the upper cladding layer 16A, the core layer 14A and a part of the lower cladding layer 12A are removed. In this way, the laminated body 10A is cut with the dicing saw 24 plural times at predetermined intervals in the widthwise direction of the laminated body, so that a plurality of cut grooves 22 are formed in parallel with each other at the predetermined intervals along the longitudinal direction of the laminated body 10A. The width, number, and intervals of the cut grooves 22 are not limited to those illustrated in FIGS. 1A to 2C, but may be appropriately set in view of the use application. The remaining portions of the core layer 14A become the core portions 14 and, for example, the intervals and number of the cut grooves may be set so as to form desired core shapes in accordance with the width, number and intervals of the cores 14 to be formed.

Further, at the cut grooves 22 the colored layer 20A, the upper cladding layer 16A and the core layer 14A are removed, and at least a part of the lower cladding layer 12A remains. When the thickness of the remaining portions (residual thickness after cutting) of the lower cladding layer 12A is too small, there is a possibility that the lower cladding layer 12A may be completely cut through due to an external force applied to the laminated body (laminated film) 10A during the cutting process. In order to prevent a complete cut-through, the residual thickness after cutting is preferably about 5 μm or more, and more preferably about 10 μm or more.

Embedded Cladding Portion

Next, the portions (cut grooves 22) of the laminated body 10A removed by cutting are filled with a cladding resin having a lower refractive index than that of the core portions 14. For example, as shown in FIG. 2C, a curable cladding resin is poured into the cut grooves 22 formed in the laminated body 10 and cured to form embedded cladding portions 18. Materials for forming the embedded cladding portions 18 are not particularly limited as long as a predetermined difference in refractive indices between the embedded cladding portions 18 and the optical waveguide core 14 can be set, but the same material as that of the lower cladding portion 12 may be used. For example, the curable cladding resin is dropped on the principal surface, on which the colored layer 20 is formed, and is spread out by centrifugal force caused by a spin coating method so that the insides of the cut grooves 22 are filled with the curable cladding resin. The method of coating with the curable cladding resin is not limited to the spin coating method, and the curable cladding resin may be pressed to the laminated body with a glass substrate or the like, for example, while controlling the layer thickness of the resin with a spacer, and cured by exposure to light. Further, when the embedded cladding portion 18 is formed, cladding portions may be formed on the colored layer 20.

In the optical waveguide (optical waveguide film) 10 of this exemplary embodiment thus manufactured, the colored layers 20 remain only on the areas that overlap with the core 14 when viewed from the principal surface of the waveguide 10.

SECOND EXEMPLARY EMBODIMENT

Figure 3A:
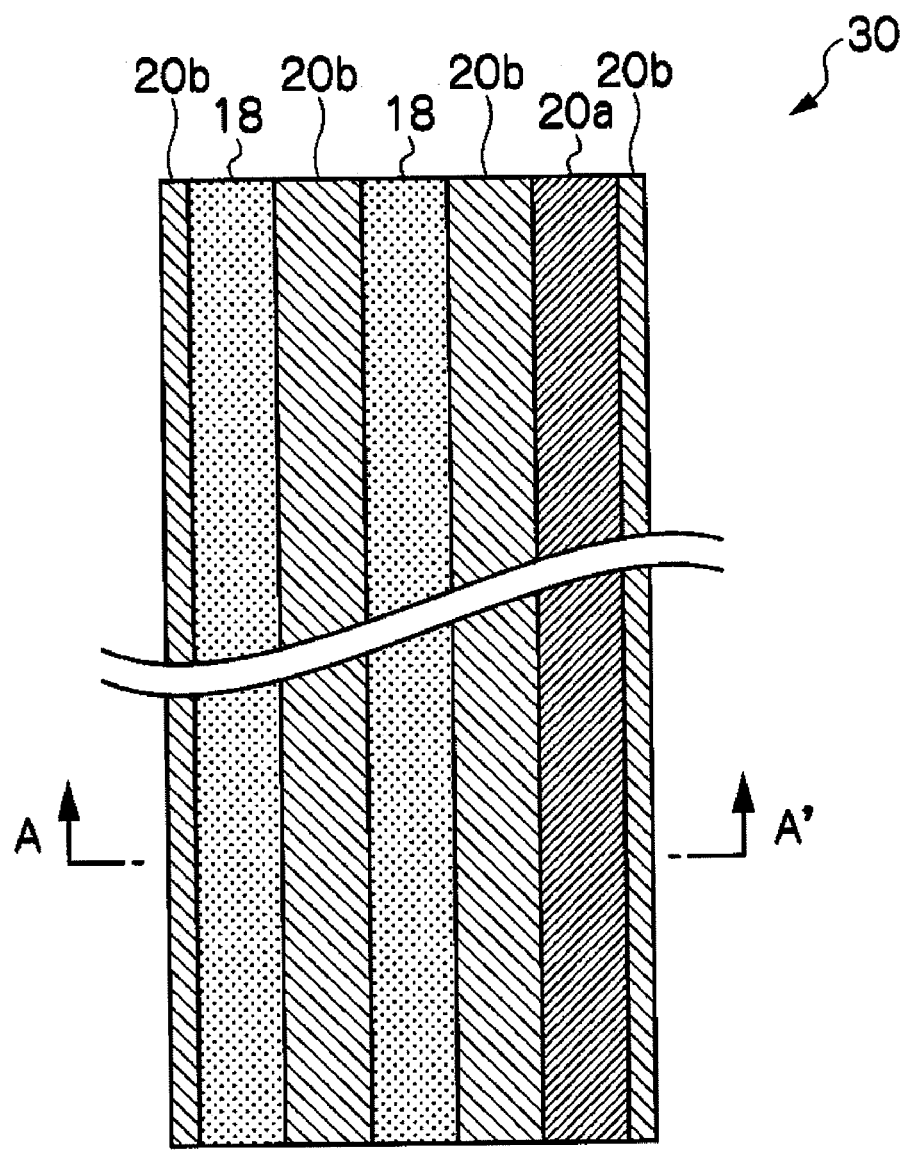
FIG. 3A is a plan view of an optical waveguide according to a second exemplary embodiment of the invention.
Figure 3B:
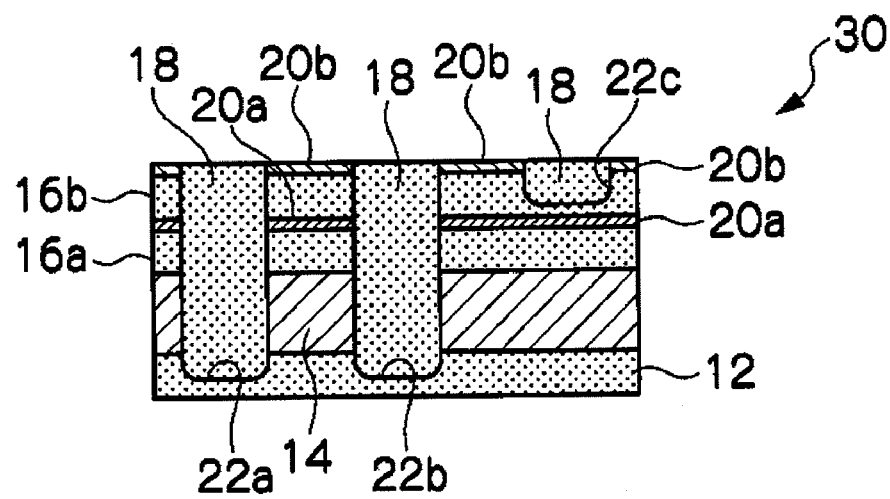
FIG. 3B is a cross-sectional view along the line A-A' in FIG. 3A.

FIG. 3A and FIG. 3B schematically show the configuration of an optical waveguide according to a second exemplary embodiment. As shown in FIG. 3B, the optical waveguide 30 has two colored layers (a first colored layer 20a and a second colored layer 20b) having different colors from each other at one principal surface side (between the core 14 and one of the principal surfaces of the optical waveguide 30) of the optical waveguide 40 with respect to the core 14. The colored layer 20a is layered on a first upper cladding portion 16a, and the colored layer 20b is layered on a second upper cladding portion 16b. The colored layers 20a and 20b are not in contact with the core 14. In this exemplary embodiment, two cut grooves 22a and 22b are formed by cutting away portions from the second color layer 20b to a part of the lower cladding portion 12. Each of the grooves 22a and 22b is filled with an embedded cladding portion 18. Meanwhile, another cut groove 22c is formed by cutting a portion from the second color layer 20b to a part of the second upper cladding portion 16b. The groove 22c is filled with an embedded cladding portion 18, and the first colored layer 20a remains intact.

Thus, as shown in FIG. 3A, when viewed from the direction substantially perpendicular to the principal surface of the optical waveguide 30, at a position corresponding to the core 14 between the deeper cut grooves 22a and 22b, the first colored layer 20a is hidden behind the second colored layer 20b so that the position of the core portion is recognizable on the basis of the second color layer 20b. On the other hand, since the embedded cladding portion 18 is transparent, the first colored layer 20a may be observed in the portion corresponding to the shallower cut groove 22c. Namely, in the optical waveguide 30 of present exemplary embodiment, the position of the core may be determined on the basis of the second colored layer 20b, and additional information may be obtained on the basis of the first colored layer 20a. For example, during fabrication of the external shape of the optical waveguide 30, the first colored layer 20a may be made visible along the cutting positions in the longitudinal direction of the optical waveguide 30. For additionally increasing the quantity of information, three or more colored layers may be formed, and the laminated body cut so that the colored layers corresponding to the information are observed. A plurality of colored layers 20a and 20b having different colors from each other are provided, so that in addition to an increase in visibility, the reference position for machining the external shape of the waveguide using an automatic machine capable of positioning by means of image recognition, and for bonding the waveguide to another optical element, may be clearly determined.

THIRD EXEMPLARY EMBODIMENT

Figure 4A:
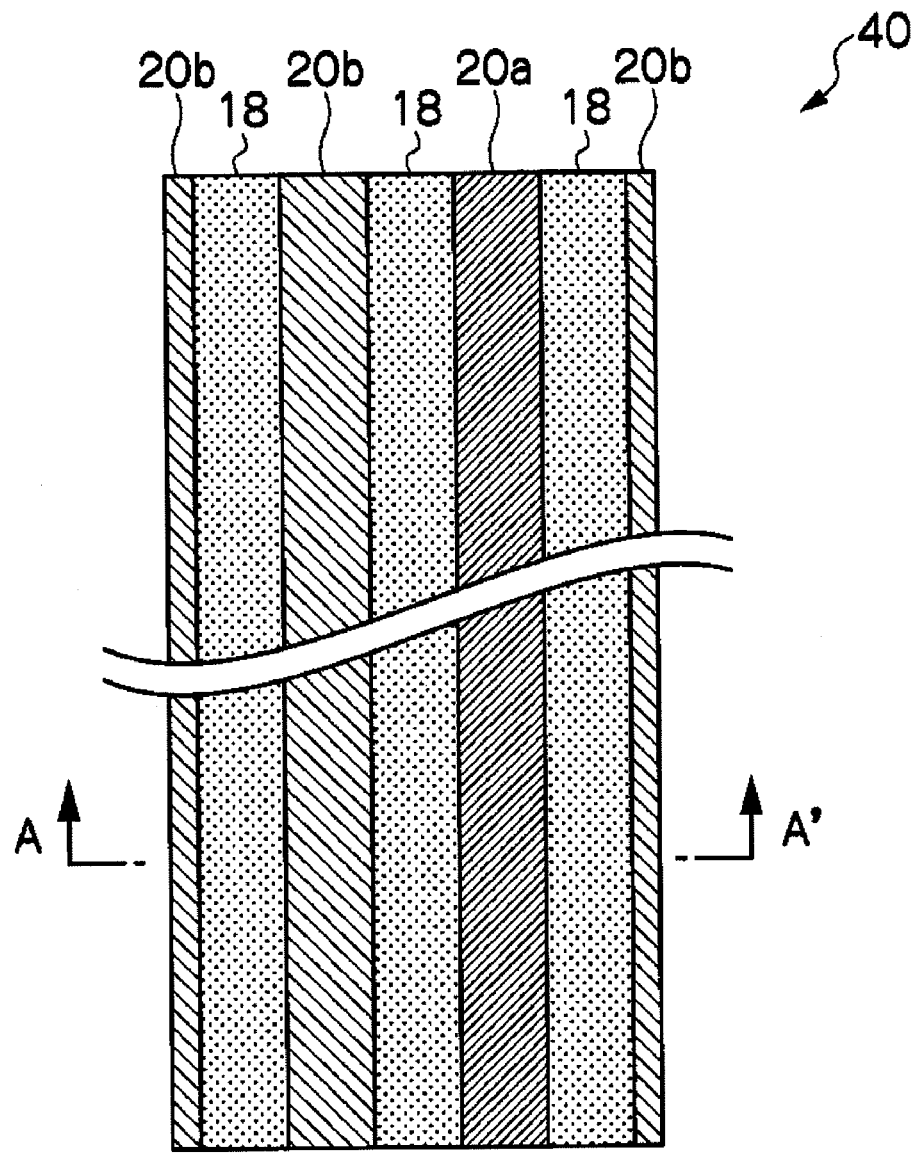
FIG. 4A is a plan view of an optical waveguide according to a third exemplary embodiment of the invention.
Figure 4B:
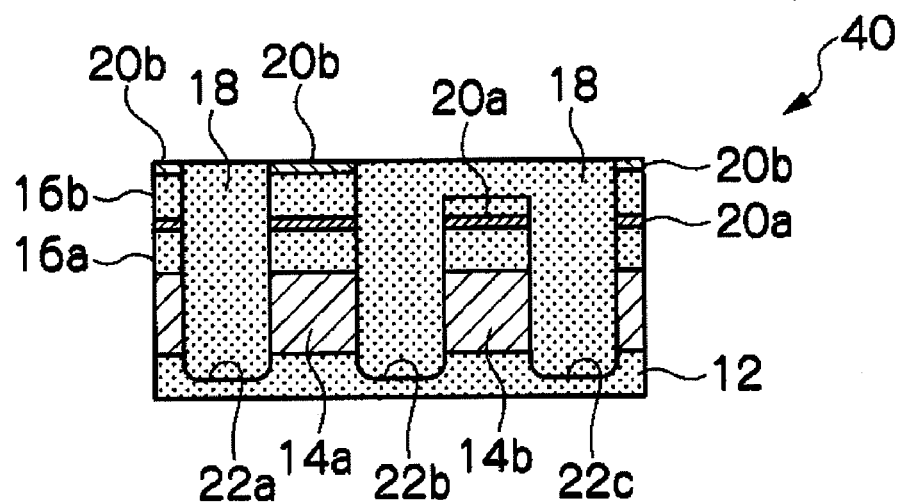
FIG. 4B is a cross-sectional view along the line A-A' in FIG. 4A.

FIG. 4A and FIG. 4B schematically show the configuration of an optical waveguide according to a third exemplary embodiment. As shown in FIG. 4B, a first colored layer 20a and a second colored layer 20b having different colors from each other are provided on one principal surface side of the optical waveguide with respect to cores 14a and 14b (between the cores 14a, 14b and one of the principal surfaces of the optical waveguide 40) without contacting the cores 14a and 14b. In this optical waveguide 40, the two core portions 14a and 14b are formed by three cut grooves 22a, 22b and 22c formed by cutting portions from the second colored layer 22b to a part of a lower cladding portion 12. Further, an embedded cladding portion 18 is embedded in a portion formed by removing the second colored layer 20b corresponding to the core portion 14b.

Thus, as shown in FIG. 4A, when viewed from the direction substantially perpendicular to the principal surface of the optical waveguide 40, either the first colored layer 20a or the second colored layer 20b is observed at the portion corresponding to the core 14b or the core 14a, respectively, so that the core positions may be recognized based on the colored layer 20a or the colored layer 20b. Accordingly, in the optical waveguide 40 in the present exemplary embodiment, the core positions may be determined based on the colored layers 20a and 20b having different colors from each other, and other information may be applied to the optical waveguide 40 based on the different colors of the colored layers 20a and 20b as observed.

FOURTH EXEMPLARY EMBODIMENT

Figure 5A:
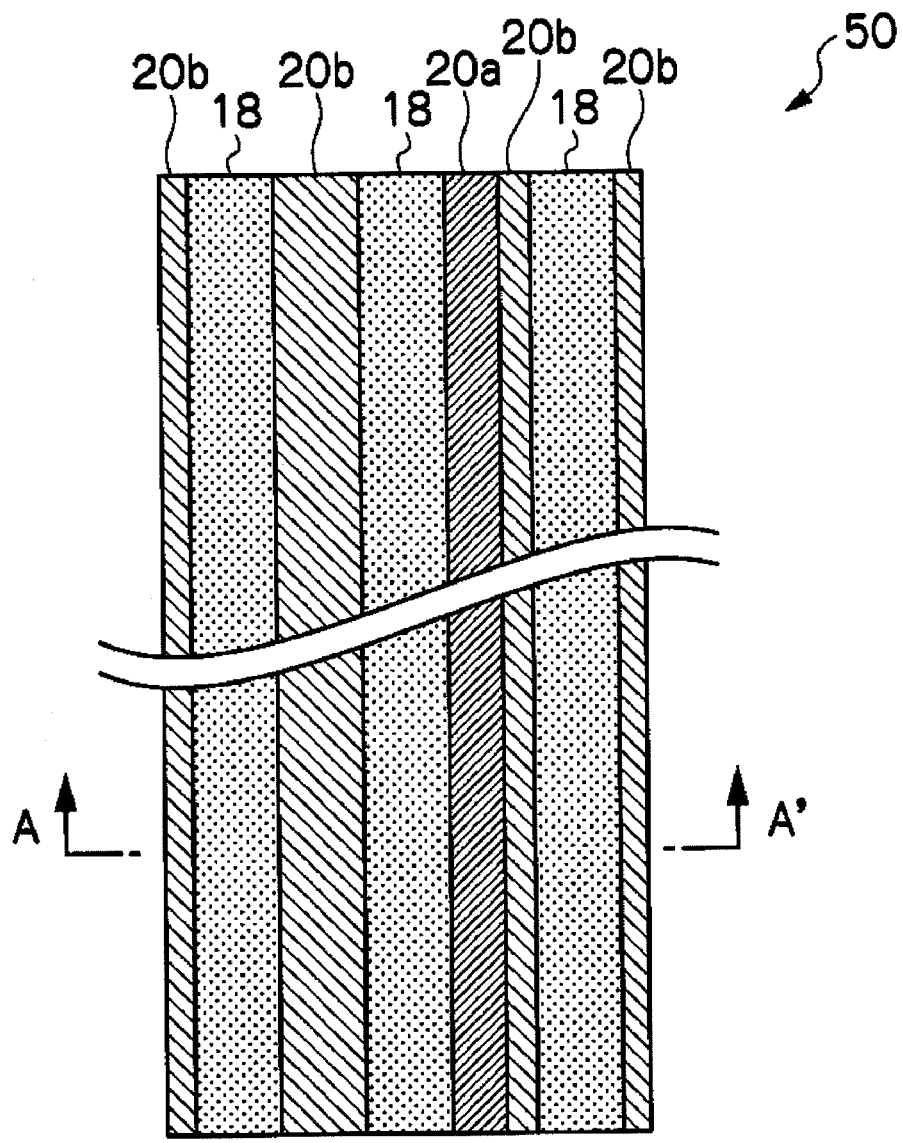
FIG. 5A is a plan view of an optical waveguide according to a fourth exemplary embodiment of the invention.
Figure 5B:
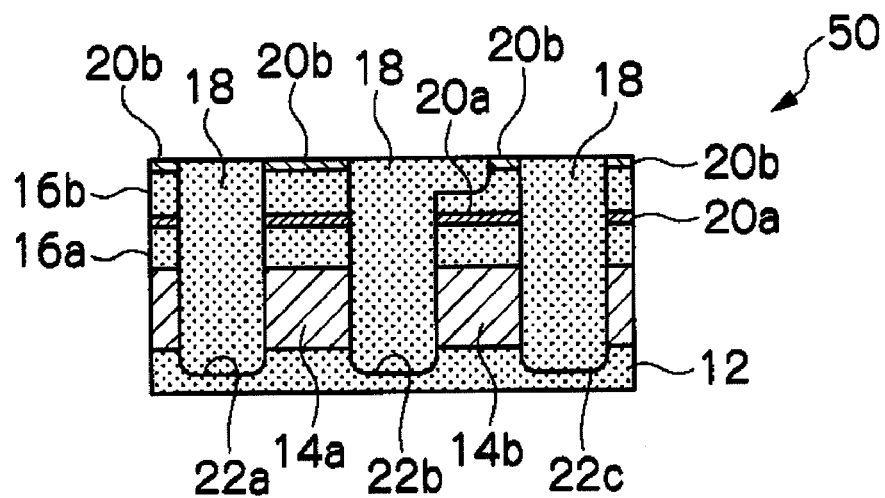
FIG. 5B is a cross-sectional view along the line A-A' in FIG. 5A.

FIG. 5A and FIG. 5B schematically show the configuration of an optical waveguide according to a fourth exemplary embodiment. As shown in FIG. 5B, in an optical waveguide 50, a first colored layer 20a and a second colored layer 20b having different colors from each other are provided on one principal surface side of the optical waveguide with respect to the cores 14a and 14b (between the cores 14a, 14b and one of the principal surfaces of the optical waveguide 50) without contacting the cores 14a and 14b. In this optical waveguide 50, the two core portions 14a and 14b are formed by three cut grooves 22a, 22b and 22c formed by cutting portions from the second colored layer 20b to a part of a lower cladding portion 12. Further, an embedded cladding portion 18 is embedded in a portion formed by removing a part of the second colored layer 20b in the longitudinal direction from a portion corresponding to the core portion 14b.

Thus, as shown in FIG. 5A, when viewed from the direction substantially perpendicular to the principal surface of the optical waveguide 50, the second colored layer 20b is observed in the portion corresponding to the core 14a, and the first colored layer 20a and the second colored layer 20b, which are adjacent to each other, are observed at the portion corresponding to the core 14b. Accordingly, in the optical waveguide 50, the core positions may be determined based on the colored layers 20a and 20b, and other information may be applied to the optical waveguide 50 based on patterns of the colored layers 20a or 20b as observed.

In the methods for manufacturing the optical waveguides 30, 40 and 50 according to the second to fourth exemplary embodiments, first, layers substantially equivalent to the lower cladding portion 12, the core layer 14, the first upper cladding portion 16a, the first colored layer 20a, the second upper cladding portion 16b and the second colored layer 20b are sequentially laminated to provide a laminated body. As materials for forming the cladding, core and colored layers, the exemplary materials described in connection with the first exemplary embodiment can be used, respectively. As materials for the two colored layers 20a and 20b, materials including pigments or the like having different colors from each other may be selected. The distance between the colored layers 20a and 20b (the thickness of the second upper cladding portion 16b) is preferably about 5 μm or more, and more preferably 10 μm or more, in view of cutting accuracy in the depth direction with a dicing saw.

The laminated body is cut to a predetermined depth, width and interval with a dicing saw to form cut grooves in accordance with the use application. Thereafter, a curable cladding resin is poured into each cut groove and is cured to form an embedded cladding portion 18. The patterns of the cut grooves are not limited to those illustrated in FIG. 3A to FIG. 5B but, for example, the patterns in the exemplary embodiments may be combined to add further information to the optical waveguide.

FIFTH EXEMPLARY EMBODIMENT

Figure 6A:
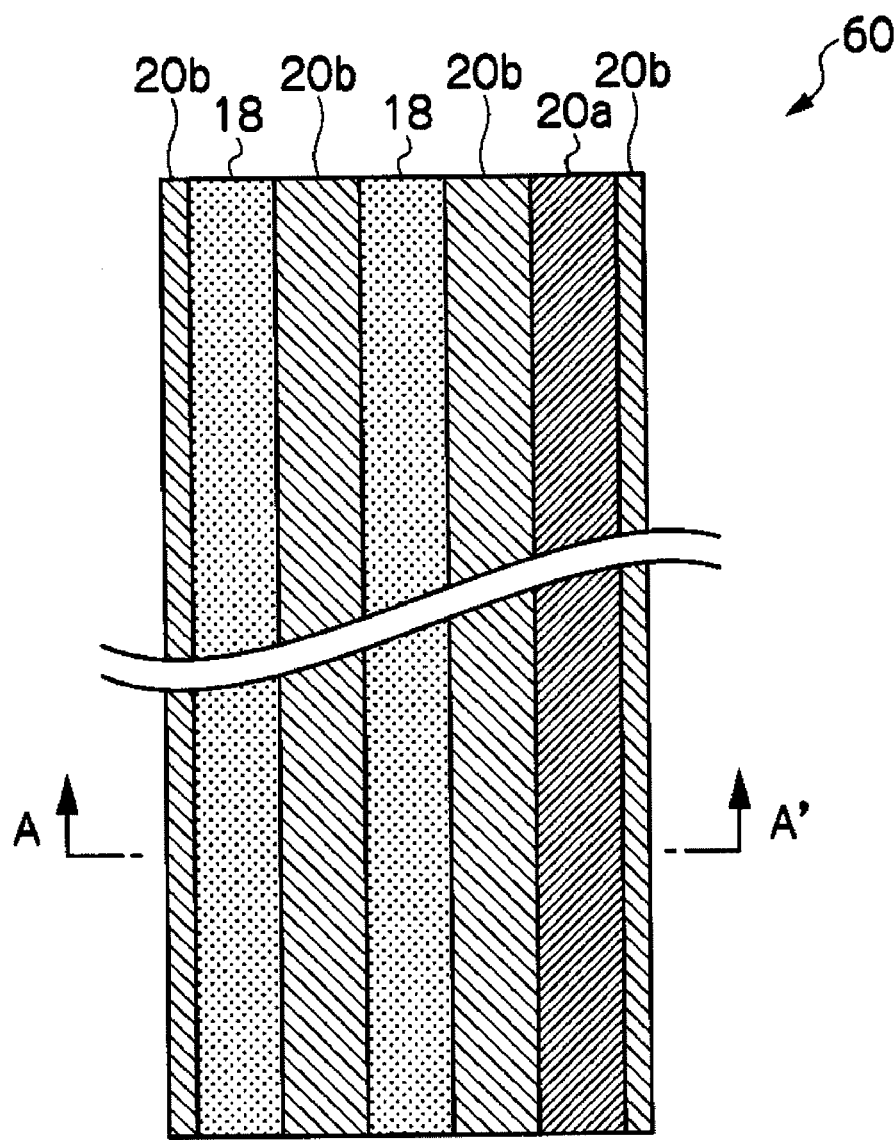
FIG. 6A is a plan view of an optical waveguide according to a fifth exemplary embodiment of the invention.
Figure 6B:
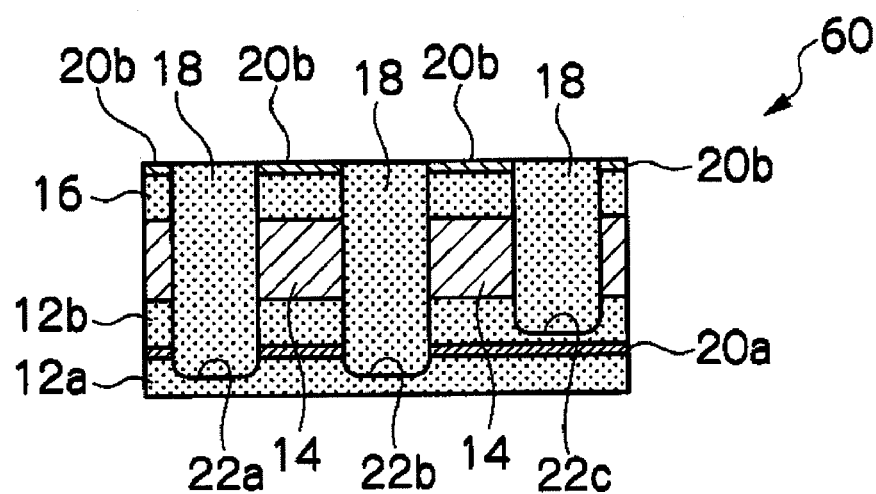
FIG. 6B is a cross-sectional view along the line A-A' in FIG. 6A.

FIG. 6A and FIG. 6B schematically show the configuration of an optical waveguide according to a fifth exemplary embodiment. As shown in FIG. 6B, in an optical waveguide 60, a first colored layer 20a and a second colored layer 20b having different colors from each other are provided at the respective principal surface sides of the core 14 (between the core 14 and each of the principal surfaces of the optical waveguide). The first colored layer 20a is laminated between two lower cladding portions (first lower cladding portion 12a and second lower cladding portion 12b), and the second colored layer 20b is laminated on an upper cladding layer 16. In this exemplary embodiment, neither of the two colored layers 20a and 20b is in contact with the core 14, and the optical characteristics of the optical waveguide 60 are not influenced by the colored layers.

Further, in the optical waveguide 60, two cut grooves 22a and 22b of the three cut grooves are formed by cutting portions from the second colored layer 20b to a part of the first lower cladding portion 12a, and embedded cladding portions 18 are embedded in the grooves 22a and 22b. On the other hand, a cut groove 22c is formed by cutting a portion from the second colored layer 20b to a part of the second lower cladding portion 12b, and an embedded cladding portion 18 is embedded in the cut groove 22c, so that the first colored layer 20a remains. Thus, as shown in FIG. 6A, when viewed from the direction substantially perpendicular to the principal surface of the optical waveguide 60, the second colored layers 20b are observed in the portions corresponding to the cores 14, and the first colored layer 20a is observed at the portion corresponding to the cut groove 22c. Accordingly, the core positions may be determined based on the second colored layers 20b, and other information may be applied to the optical waveguide 60 based on the first colored layer 20a.

When the optical waveguide 60 according to this exemplary embodiment is manufactured, layers substantially equivalent to the first lower cladding portion 12a, the first colored portion 20a, the second lower cladding portion 12b, the core 14, the upper cladding portion 16 and the second colored layer 20b, for example, are sequentially laminated to provide a laminated body. The laminated body is cut to a predetermined depth, width and interval with a dicing saw to form cut grooves. Thereafter, a curable cladding resin is poured into each cut groove 22a, 22b and 22c, and is cured to form an embedded cladding portion 18.

When a plurality of colored layers 20a and 20b are respectively provided at both sides (in the lamination direction) with respect to the core 14, formation of the core portion 14, and formation of patterns of the colored layers 20a and 20b are effectively performed with fewer cutting processes as compared with a case in which the colored layers 20a and 20b are provided at one side of an optical waveguide with respect to the core 14. For example, when the optical waveguide 40 or 50 according to the third exemplary embodiment or the fourth exemplary embodiment is manufactured, as shown in FIGS. 4A to 5B, in addition to the cutting processes for forming two core portions 14a and 14b, cutting processes for patterning only the colored layers 20a and 20b are required. In contrast, when the colored layers 20a and 20b are provided at both sides (in the lamination direction) of the core 14, as shown in FIG. 6B, the cutting patterns of the colored layers 20a and 20b can be changed only by changing the cutting depth at the time of the formation of the two core portions 14. Further, when the colored layer 20a and the colored layer 20b are respectively provided at either principal surface side (between the core 14 and each of the principal surfaces of the optical waveguide) with respect to core 14 in an optical waveguide 60, the distance between the colored layer 20a and the colored layer 20b may be relatively larger, so that the height of the dicing saw may be easily adjusted.

However, for example, for an optical waveguide in which the end surface in the longitudinal direction of the optical waveguide is an inclined surface at an angle of 45°, and light is refracted at an angle of 90° on the inclined surface, the light is shielded with one colored layer when the colored layers are disposed at either side of the core. Accordingly, in such an optical waveguide, as described in the first exemplary embodiment to the fourth exemplary embodiment, the optical waveguide may have colored layers provided only at one principal surface side (between the core and one of the principal surfaces).

Further, in the above exemplary embodiments, although mainly cases in which the colored layer is cut at the same time as the core is formed to improve the visibility of the core positions are explained, after the embedded cladding portions 18 have been applied and cured, for example, a part of the colored layer may be cut to form position recognition marks formed by the absence or presence of the colored layer. The accuracy of positioning of the dicing saw is at most about 5 μm, and the position recognition marks other than the cores may be formed with sufficient accuracy for a multimode optical waveguide.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

EXAMPLES

Hereinafter, examples will be explained, but the invention is not limited to the examples.

Example 1

An epoxy ultraviolet ray curable resin having a refractive index of 1.60 is prepared as a core resin and an epoxy ultraviolet ray curable resin having a refractive index of 1.55 is prepared as a cladding resin.

The cladding resin (25 μm in thickness), the core resin (50 μm in thickness) and the cladding resin (25 μm in thickness) are spin coated in this order and cured on borosilicate glass having a length of one side of 120 mm and thickness of 3 mm to form a three layered polymer film.

Next, a colored cladding material in which azo-type ultra-fine red pigment particles are dispersed and mixed with the cladding resin is applied on the film by the spin coating method, and cured to form a colored layer having a thickness of 10 μm. Thus, a polymer film with a colored layer is obtained.

Thereafter, the polymer film with a colored layer is cut, from the principal surface (the uppermost surface) side where the colored layer is formed, with a dicing saw (trade name: DAD 321; manufactured by DISCO Corporation) having a blade with a thickness of 100 μm such that core portions having a width of 50 μm are aligned at a pitch of 500 μm at a blade height of 10 μm from the lowermost surface of the polymer film.

Further, an epoxy ultraviolet ray curable resin (refractive index: 1.55) is applied to the cut portions formed by the above cutting process, exposed to ultraviolet rays and cured. The resultant polymer film is peeled off from the borosilicate glass.

The polymer film is cut with a dicing saw to form a two-channel optical waveguide having a length of 100 mm and a width of 0.9 mm. The alignment in the cutting process is performed by recognizing the pattern of the colored layer of the optical waveguide by using an image recognition function of the dicing saw.

The distance of the core of the optical waveguide from an edge of the optical wave guide in the short-side direction (width direction) is measured. The deviation of the distance from the designed value is 2 μm, and an excellent external shape is formed by image recognition.

Example 2

By the use of the same core resin and cladding resin as those in Example 1, on a borosilicate glass substrate as the lowermost portion, a first cladding layer (25 μm in thickness), a core layer (50 μm in thickness), a second cladding layer (15 μm in thickness), a first colored layer (10 μm in thickness), a third cladding layer (15 μm in thickness), and a second colored layer (10 μm in thickness) are sequentially laminated in this order by a spin coating method to obtain a multi-layered polymer film with colored layers. The first colored layer is formed by using a colored cladding material obtained by dispersing and mixing ultra-fine red azo pigment particles with the cladding resin, and the second colored layer is formed by using a colored cladding material obtained by dispersing and mixing ultra-fine phthalocyanine blue pigment particles with the cladding resin.

Thereafter, the multi-layered polymer film thus obtained is cut with the dicing saw (trade name: DAD 321; manufactured by DISCO Corporation) having a blade with a thickness of 120 μm at a blade height of 10 μm from the lowermost surface of the polymer film, so that core portions having a width of 50 μm are aligned at a pitch of 250 μm. In the cutting process, every time four cores have been formed, the cutting height and blade position are changed so that only the second colored layer above the core portion of the two colored layers is cut. As a result, an optical waveguide having a cross-sectional shape whose general concept is shown in FIG. 3B is obtained.

Further, an epoxy ultraviolet ray curable resin (refractive index: 1.55) is applied on the cut portions formed by the above process, exposed to ultraviolet ray and cured. The resultant polymer film is peeled off from the borosilicate glass. The polymer film is cut with the dicing saw to form a four-channel optical waveguide having a length of 100 mm and a width of 0.9 mm. The alignment in the cutting process is performed by recognizing the pattern of the colored layer of the optical waveguide by using an image recognition function of the dicing saw.

The distance of the core of the optical waveguide from an edge of the optical waveguide in the short-side direction (width direction) is measured. The deviation of the distance frm the designed value is 2 μm, and an excellent external shape is formed by image recognition.

Example 3

By the use of the same core resin and cladding resin as those in Example 1, on a borosilicate glass substrate as the lowermost portion, a first cladding layer (25 μm in thickness), a first colored layer (10 μm in thickness), a second cladding layer (15 μm in thickness), a core layer (50 μm in thickness), a third cladding layer (15 μm in thickness), and a second colored layer (10 μm in thickness) are sequentially laminated in this order by a spin coating method to obtain a multi-layered polymer film. The first colored layer is formed by using a colored cladding material obtained by dispersing and mixing ultra-fine red azo pigment particles with the cladding resin, and the second colored layer is formed by using a colored cladding material obtained by dispersing and mixing ultra-fine phthalocyanine blue pigment particles with the cladding resin.

Thereafter, after seven grooves are formed by cutting the polymer film thus obtained with the dicing saw (trade name; DAD 321 manufactured by DISCO Corporation) having a blade with a thickness of 120 μm at a blade height of 10 μm from the lowermost surface of the polymer film, one groove is formed by cutting the film at a blade height of 45 μm from the lower bottom surface. By repeating this process, an optical waveguide having a cross-sectional shape whose general concept is shown in FIG. 6B, in which core portions having a width of 50 μm are arrayed at a pitch of 250 μm, is obtained.

Further, an epoxy ultraviolet ray curable resin (refractive index: 1.55) is applied to the cut portions formed by the above process, exposed to ultraviolet ray and cured. The resultant polymer film is peeled off from the borosilicate glass.

The polymer film is cut with the dicing saw to form a four-channel optical waveguide having a length of 100 mm and a width of 0.9 mm. The alignment in the cutting process is performed by recognizing the pattern of the colored layer of the optical waveguide by using an image recognition function of the dicing saw.

The distance of the core of the optical waveguide from an edge of the optical waveguide in the short-side direction (width direction) is measured. The deviation of the distance from the designed value is 2 μm, and an excellent external shape is formed by image recognition.

The invention is not limited to the above exemplary embodiments and the examples, and may be appropriately modified. For example, the optical waveguide may have only one core, or may have plural cores laminated in the thickness direction. Further, materials for the optical waveguide are not limited to resins, and may be glass.

Furthermore, the cutting means for the laminated body is not limited to a dicing saw, and may be other cutting tools.

What is claimed is:

1. An optical waveguide comprising:
   a cladding;
   at least one core embedded in the cladding; and
   a colored layer that is provided at a portion substantially overlapping with the core when viewed from a direction perpendicular to principal surfaces of the optical waveguide, and that does not contact with the core;
   wherein the optical waveguide comprises a plurality of cores that are embedded in the cladding substantially parallel with each other on a plane substantially parallel with the principal surfaces of the optical waveguide.

2. The optical waveguide according to claim 1, wherein two or more colored layers having respectively different colors are provided between the plurality of cores and one of the principal surfaces of the optical waveguide.

3. The optical waveguide according to claim 2, wherein the two or more colored layers include a first colored layer and a second colored layer, and the second colored layer has a larger coverage ratio than that of the first colored layer.

4. The optical waveguide according to claim 3, wherein the first colored layer is present on only some of plurality of portions overlapping the plurality of cores.

5. The optical waveguide according to claim 3, wherein at least one of the plurality of portions overlapping the plurality of cores each has a first colored layer on only a part thereof.

6. The optical waveguide according to claim 1, wherein a first colored layer is provided between the plurality of cores and one of the principal surfaces of the optical waveguide, and a second colored layer having a color different from the first colored layer is provided between the plurality of cores and another of the principal surfaces of the optical waveguide.

7. The optical waveguide according to claim 1, wherein the colored layer is formed as an image recognition mark.

8. The optical waveguide according to claim 1, wherein a residual thickness of the cladding after cutting is about 5 μm or more.

9. A method for forming an optical waveguide comprising:
   providing a laminated body including a core layer, at least two cladding layers that are laminated so as to sandwich the core layer, and a colored layer that is laminated without contacting the core layer;
   forming a core portion by cutting the laminated body from a principal surface side of the laminated body at which the colored layer is provided to remove a part of the laminated body including a part of the colored layer, at least a part of one cladding layer of the at least two cladding layers at the side of the principal surface and a part of the core layer; and
   embedding a resin having a lower refractive index than that of the core portion into portions where the part of the laminated body has been removed by cutting.

10. The method for forming an optical waveguide according to claim 9, wherein the cutting is performed with a dicing saw.

11. The method for forming an optical waveguide according to claim 9, wherein the laminated body includes at least two colored layers having respectively different colors, and at least one of the colored layers is removed by cutting.

12. The method for forming an optical waveguide according to claim 9, wherein a residual thickness of the cladding after cutting is about 5 μm or more.

* * * * *